Feb. 21, 1933.                C. I. McNEIL                 1,898,559
                          ELECTRICAL APPARATUS
                          Filed March 8, 1929
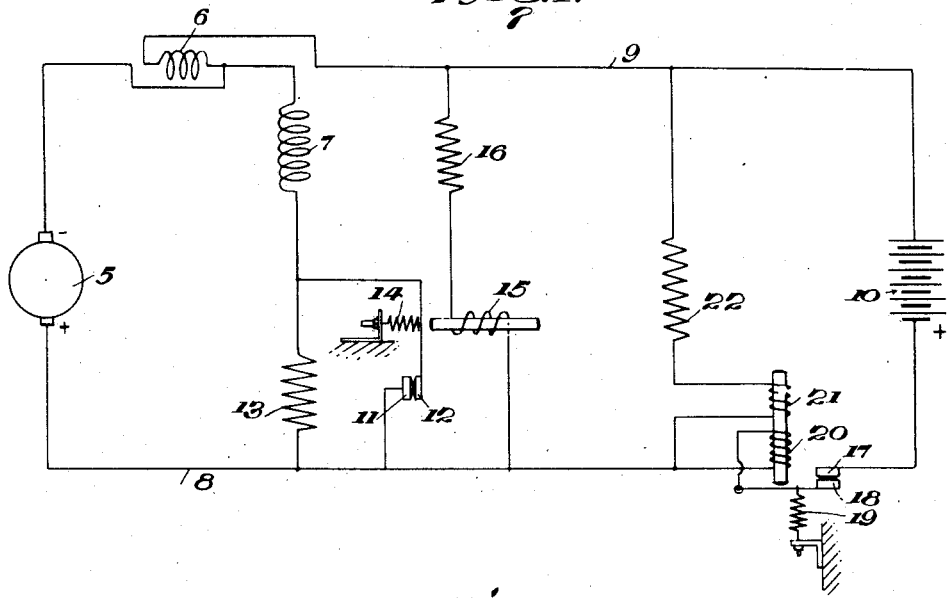
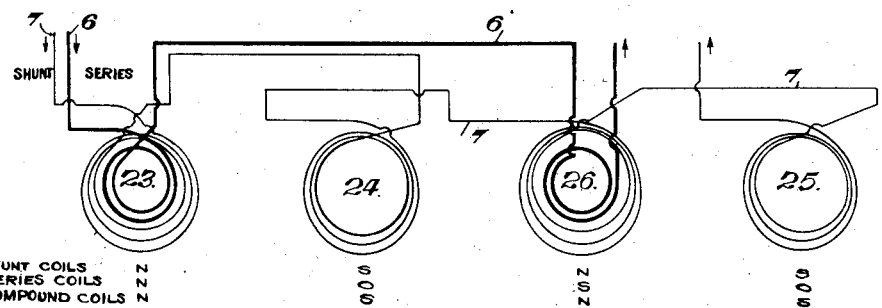
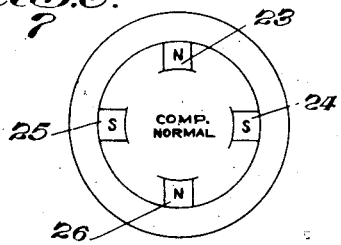   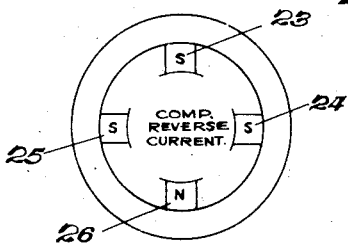
Inventor
Charles I. McNeil
By
Cameron, Kerkam & Sutton.
Attorney Patented Feb. 21, 1933

1,898,559

UNITED STATES PATENT OFFICE

CHARLES I. McNEIL, OF BLOOMFIELD, NEW JERSEY, ASSIGNOR TO ECLIPSE MACHINE COMPANY, OF ELMIRA HEIGHTS, NEW YORK, A CORPORATION OF NEW YORK

ELECTRICAL APPARATUS

Application filed March 8, 1929. Serial No. 345,533.

This invention relates to electrical generators, and more particularly to a generator of the compound type and to a method of winding the field coils thereof.

In many instances, as where a generator is employed to charge a battery for example, the cut-out switch between the generator and battery has been accidentally closed when the generator was not in operation with the result that the polarity of the generator is reversed or destroyed, if the same is of the compound type, by the reverse flow of current through the series field winding. In order to restore the polarity to normal it is usually necessary to disconnect the generator from its associated circuit and pass a current through the field windings in the proper direction. While a generator of the shunt wound type is not subject to the above difficulty due to the fact that current from the battery will flow in the same direction through the field winding, under conditions similar to those set out above, as the normal flow, this type of generator is not entirely satisfactory for certain installations for reasons well understood in the art.

Accordingly, one of the objects of the present invention is to provide a compound generator which is so constructed as to overcome the above difficulty.

Another object is to provide a compound generator having a novel series field winding associated with the shunt field winding.

A further object is to provide a novel method for winding the field coils of a compound generator whereby a reverse flow of current through the series winding is ineffective to reverse the polarity of the generator.

The invention will be readily understood from the following detailed description taken in connection with the accompanying drawing, wherein like reference characters refer to like parts throughout the several views, and wherein—

Fig. 1 is a diagrammatic view of a compound generator in a battery charging circuit;

Fig. 2 is a diagrammatic view illustrating one manner in which the field coils may be wound in accordance with the present invention, and also showing the polarity of the fields normally set up by the coils;

Fig. 3 is a diagrammatic view illustrating the normal polarity of the poles of the generator; and Fig. 4 is a diagrammatic view illustrating the polarity of the poles of the novel generator after the passage of current through the series field coils in a reverse direction.

As shown in Fig. 1 the armature 5 of a compound generator having a series field coil 6 and a shunt field coil 7 is connected through the positive and negative mains 8 and 9, respectively to a battery 10.

In certain installations as, for example, when the armature is driven by an internal combustion engine which is operated at variable speeds, it is desirable to provide voltage regulating means for controlling the output of the generator. As shown, the regulator is of the vibratory type embodying the usual fixed contact 11 and movable contact 12 which are adapted to short-circuit a resistance unit 13 which is in series with the shunt coil 7. The contacts are normally held in engagement by a resilient member 14, but when the voltage output of the generator exceeds a predetermined amount the contacts are opened by an electro-magnet embodying a coil 15 in series with a resistance unit 16, said coil and unit being connected across the mains 8 and 9.

A cut-out switch is positioned, electrically, between the battery 10 and the generator, and is so constituted that when the generator voltage falls below that of the battery, as when the operation of the generator is discontinued, the contacts of the switch will be opened to prevent current from flowing from the battery to the generator. As shown, the cut-out switch embodies a fixed contact 17 and a movable contact 18 which are adapted to be closed against the tension of a suitable spring 19, and, when the battery is being charged, are held in engagement by an electro-magnet embodying a current coil 20, in series with the contacts and the positive main 8, and a voltage coil 21 which is shunted across the mains 8 and 9. A resistance 22 is preferably placed in series with coil 21.

When the generator is placed in operation the field set up by coil 21 is effective to overcome the action of spring 19 and to close contacts 17 and 18. The generator now charges battery 10 and the current coil 20 coacts with the voltage coil 21 to maintain the contacts 17 and 18 closed. If the generator voltage drops, due to a change in the armature speed, for example, to a point such that the battery discharges one or two amperes, the current coil 20 opposes or "bucks" the action of coil 21 whereupon spring 19 opens contacts 17 and 18.

When the above installation is mounted on a movable body such as an aeroplane, for example, jars or shocks incident to landing the plane, may be imparted to the cut-out switch at a time when the voltage output of the generator is low. The forces set up may be sufficient to accidentally close contacts 17 and 18 and the surge of current from the battery may be of such a character as to fuse the contacts together or to set up in coil 20 a field sufficiently strong to hold the contacts closed against the tension of spring 19.

A portion of the battery current now flows in a normal direction through the shunt field coils, but a larger part of the same flows in a reverse direction through the series field coils whereby the polarity of the generator, if the latter is provided with series windings of the type heretofore employed, is reversed or destroyed. If the generator is now set in operation the battery will be damaged or no current will be delivered and hence it is necessary to disconnect said generator and to direct current through the field coils thereof in a manner to restore the polarity to normal.

The compound generator of the present invention is so constituted that a reverse flow of current through the series coils is ineffective to produce the objectionable results set out above.

Referring now to Fig. 2, there is diagrammatically illustrated a novel compound field winding for a four pole generator. The shunt coil 7 is wound on pole 23 in a clockwise direction, for example, so that the field thereof is positive and pole 23 constitutes a north pole. Coil 7 is wound on poles 24 and 25 in a counter-clockwise direction so that the latter constitute south poles, and on pole 26 in a clockwise direction to provide another north pole.

The series field coil 6 is wound on the diametrically opposite north poles 23 and 26 but in the illustrated embodiment of the invention it is not wound on poles 24 and 25. As shown, the series coil is wound in a clockwise direction on pole 23 and coacts with the shunt coil to make this pole a strong north pole in normal operation of the generator. On pole 26, the series coil is wound in a direction opposite to that of the shunt coil and tends to make said pole a south pole. Only a relatively small number of turns of the series coil are provided on pole 26, however, and the field set up by the compound winding is such as to make said pole a north pole under normal conditions.

If current flows from the battery through the field windings of the novel generator of the present invention, the direction of flow through the shunt coil is the same as that under normal operation. The reverse flow through the portion of the series coil on additively wound pole 23, however, generates a field which opposes that set up by the shunt coil thereon, and if the current flow is sufficiently great, will reverse the polarity of said pole. The reverse current in the portion of the series coil on differentially wound pole 26, on the other hand, sets up a field which is positive or north and which coacts with that set up by the shunt coil to make pole 26 a strong north pole, as shown in Fig. 4.

When the generator is again placed in operation the field flux of poles 24, 25 and 26 coacts with the armature to generate a flow of current in the normal direction whereby the polarity of pole 23 is quickly restored to normal and the generator is effective to charge battery 10 in the usual manner.

There is thus provided a novel generator which is capable of a wide variety of uses, but which is particularly adapted for use in aircraft installations. The novel method of winding the compound field coils is effective to prevent a reversal of the polarity of the generator thereby avoiding any likelihood of damage to the battery from a reversed charging current, or prevent any failure of the generator to supply charging current.

If desired, the series winding may be provided on all of the poles, the field set up by the series coil on one pole opposing that set up by the shunt coil in a manner described in connection with pole 26, while the series coils on the three remaining poles set up fields which, during the normal operation, coact with the fields set up by the shunt coils in a manner described in connection with pole 23. Under these conditions pole 26 would retain its north polarity, pole 23 would become a south pole as described, while poles 24 and 25 would become north poles if current flowed from the battery through the compound windings. When the generator is again set in normal operation, pole 23 is promptly restored to its original north polarity and poles 24 and 25 to south polarity.

While the embodiment of the invention illustrated and described is constituted by a four-pole generator it will be understood that the invention is not limited to the form shown in the drawing. As will be understood by those skilled in the art, the field coils may be wound in a variety of ways it only being necessary that the direction of current flow therein conforms to that set forth above, and the term "direction electrically" as employed herein refers to current flow and not necessarily to the direction of the coil winding. Reference will therefore be had to the appended claims for a definition of the limits of the invention.

What is claimed is:

1. In apparatus of the class described, the combination of a battery, a charging generator in circuit with said battery and having series and shunt field windings, a cut-out switch in said circuit adapted to open when the generator voltage falls below the battery voltage, and means responsive upon failure of the cut-out switch to open for preventing reversal of the magnetism of one of the poles of said generator due to reversal of current through said series winding comprising differentially wound and connected series and shunt field windings on one of said poles so connected that the differential series field flux is normally less than the shunt field flux during the entire battery charging period.

2. In combination, a storage battery, a multi-polar charging generator in circuit with said battery, a voltage regulator for the generator, said generator having a compound winding with the series and shunt fields being differentially connected and wound on one of the poles and additively connected and wound on another pole, the series field flux on said first named pole being normally less than the shunt field flux thereon.

3. A multi-polar direct current generator having a shunt field winding and a series field winding, said series field winding being wound and connected additively on one of said poles and differentially on another of said poles, the differential winding being so constituted that the series field flux is normally less than the shunt field flux whereby a reversal of the magnetism of the differentially wound pole is prevented upon a reversal of current in the series field winding.

4. In combination, a storage battery, a multi-polar charging generator in circuit with said battery and having series and shunt wound poles, a cut-out switch in the circuit to prevent reversal of current flow therein, and means for preventing reversal of one of said poles or closing of said switch while the generator voltage is less than the battery voltage comprising differentially wound and connected series and shunt field windings thereon, said series winding having a number of turns such that the series field flux is less than the shunt field flux for normal operation.

5. In combination, a battery and a charging generator in circuit with said battery, said generator having a multi-polar shunt field winding and a series field winding, said series field winding being wound and connected additively with said shunt field winding on one or more of the generator poles and differentially on another pole, and a cut-out switch in said circuit adapted to normally open when the generator voltage falls below the battery voltage whereby upon the failure of the cut-out switch to remain open the differentially wound series field coil will prevent a reversal of the magnetism of its pole.

6. In a compound generator having a plurality of poles, shunt field coils carried by the poles and series field coils on alternate poles, the series coil on one alternate pole being wound and connected in the same direction electrically as the shunt coil thereon, and a series coil on another of said alternate poles being wound and connected in the opposite direction electrically to that of the shunt coil thereon.

7. A generator having four poles, shunt field coils wound and connected in opposite directions electrically on adjacent poles, and a series field coil wound and connected in the same direction electrically as the shunt coil on one pole and in an opposite direction electrically to the shunt coil on an alternate pole, the ampere turns of the series coil on the alternate pole being less than the ampere turns of the shunt field coil on the pole whereby a reversal of magnetism of the alternate pole is prevented upon a reversal of current in the series field coils.

8. In an apparatus of the class described the combination of a battery, a multi-polar charging generator in circuit with said battery and having series and shunt field windings, and means to prevent reversal of the magnetism of certain of the poles of said generator due to reversal of current through said series winding comprising differentially wound and connected series and shunt field windings on one of said poles so related that the series field flux is normally less than the shunt field flux during the entire battery charging period.

9. In an apparatus of the class described the combination of a battery, a multi-polar charging generator in circuit with said battery and having series and shunt field windings, means for preventing a reverse current flow when the generator voltage falls below the battery voltage and a second means upon failure of the first named means to prevent reversal of the magnetism of one of the poles of said generator due to reversal of current through said series winding comprising differentially wound and connected series and shunt field windings on one of said poles so related that the series field is normally less than the shunt field flux during the entire battery charging period.

10. In apparatus of the class described, the combination with a battery, of a charging generator of the multi-polar type in which all polar arcs are substantially equal, said generator being in circuit with said battery, means for preventing a reverse current flow when the generator voltage falls below the battery voltage, and magnetic flux controlling means for maintaining normal generator polarity even though such a reverse current flow should take place notwithstanding said preventing means, said polarity maintaining means comprising differentially connected series and shunt field windings on certain of the pole pieces and cumulatively connected series and shunt field windings on certain of the other pole pieces.

In testimony whereof I have signed this specification.

CHARLES I. McNEIL.